US006912454B2

(12) United States Patent
Astorino

(10) Patent No.: US 6,912,454 B2
(45) Date of Patent: Jun. 28, 2005

(54) ACTIVE NOISE CONTROL SYSTEM WITH HORN SOUND FEATURE

(75) Inventor: John F. Astorino, Livonia, MI (US)

(73) Assignee: Siemens VDO Automotive Inc., Chatham (CA)

( * ) Notice: Subject to any disclaimer, the term of this patent is extended or adjusted under 35 U.S.C. 154(b) by 0 days.

(21) Appl. No.: 10/463,732

(22) Filed: Jun. 17, 2003

(65) Prior Publication Data

US 2003/0233180 A1 Dec. 18, 2003

Related U.S. Application Data

(60) Provisional application No. 60/389,584, filed on Jun. 18, 2002.

(51) Int. Cl.[7] ........................ G10K 11/178; G06F 19/00

(52) U.S. Cl. ........................................ 701/36; 307/10.1

(58) Field of Search ........................ 701/1, 36; 307/9.1, 307/10.1; 381/71.4

(56) References Cited

U.S. PATENT DOCUMENTS 3,868,684 A 2/1975 Nunn, Jr.
4,441,086 A * 4/1984 Karlow et al. .............. 330/297
5,493,616 A * 2/1996 Iidaka et al. ............... 381/71.4
5,499,302 A * 3/1996 Nagami et al. ............ 381/71.4
5,848,168 A * 12/1998 Shipps et al. .............. 381/71.5
6,121,692 A * 9/2000 Michaels et al. .......... 307/10.1
2004/0240679 A1 * 12/2004 Kennedy et al. .............. 381/82

FOREIGN PATENT DOCUMENTS

EP 0 486 180 A2 5/1992
GB 2 252 657 A 8/1992
GB 2 254 979 A 10/1992
WO WOI 01/33545 A1 5/2001

* cited by examiner

*Primary Examiner*—Michael J. Zanelli

(57) ABSTRACT

An active noise control system for use onboard a vehicle normally provides noise cancellation of engine sounds. The speaker of the active noise control system also emits a horn sound responsive to appropriate commands from a controller that receives a horn switch signal from a horn switch supported on a steering wheel assembly. The active noise control system controller enters a power saving mode when the vehicle ignition is turned off and the vehicle is not running. A horn switch activation during the power saving mode wakes up the controller so that the controller unmutes an amplifier and drives the speaker to emit the desired horn sound.

11 Claims, 1 Drawing Sheet

ACTIVE NOISE CONTROL SYSTEM WITH HORN SOUND FEATURE

CROSS-REFERENCE TO RELATED APPLICATIONS

This application claims priority to U.S. Provisional Application No. 60/389,584, which was filed on Jun. 18, 2002.

BACKGROUND OF THE INVENTION

This invention generally relates to active noise control systems for vehicles. More particularly, this invention relates to operating an active noise control system to provide a horn sound when a vehicle is not running.

Most vehicles include a horn that is activated by pressing or more switches typically mounted on a steering wheel assembly. The horn is properly used to notify other drivers or pedestrians of a vehicle's presence or approach, for example. Typical horn assemblies include a physical horn component mounted within the engine compartment that emits the horn sound responsive to appropriate switch activation.

Active noise control systems are well known. On modern vehicles, active noise control systems operate to cancel out noises associated with air intake assemblies, for example. A noise control system typically includes a speaker that is driven to emit a sound that cancels out engine noise sounds that otherwise may be noticed by an individual within the passenger compartment. A controller drives the speaker to provide the necessary noise cancellation signal or sound to provide the desired effect.

With the advances available in electronics onboard vehicles, those skilled in the art are always striving to provide additional features and functions for the consumer. Further, there is always a need to strive for minimizing the expenses associated with supplying vehicle components to manufacturers. This invention takes advantage of the capabilities of an active noise control system and provides further capabilities that eliminates otherwise needed separate components such as a horn.

SUMMARY OF THE INVENTION

In general terms, this invention is an active noise control system that also provides a horn sound function even when the vehicle is not running.

One example system designed according to this invention includes a speaker. A controller drives the speaker to produce a desired sound. The controller operates in a normal mode while the vehicle is running and typically drives the speaker to produce a noise cancellation sound to cancel out noises associated with operation of the engine so that such noises are not noticeable within the vehicle passenger compartment. The controller also operates in a power saving mode when the vehicle is not running. The controller wakes up from the power saving mode responsive to a horn switch activation that occurs when the vehicle is not running. The controller then drives the speaker to emit a horn sound and returns to the power saving mode after the horn switch activation is complete.

In one example, the system includes an amplifier associated with the speaker. The controller mutes the amplifier in the power saving mode and unmutes the amplifier responsive to the horn switch activation so that the desired horn sound is produced.

The various features and advantages of this invention will become apparent to those skilled in the art from the following detailed description of a currently preferred embodiment. The drawings that accompany the detailed description can be briefly described as follows.

DETAILED DESCRIPTION OF THE PREFERRED EMBODIMENT

Figure 1:
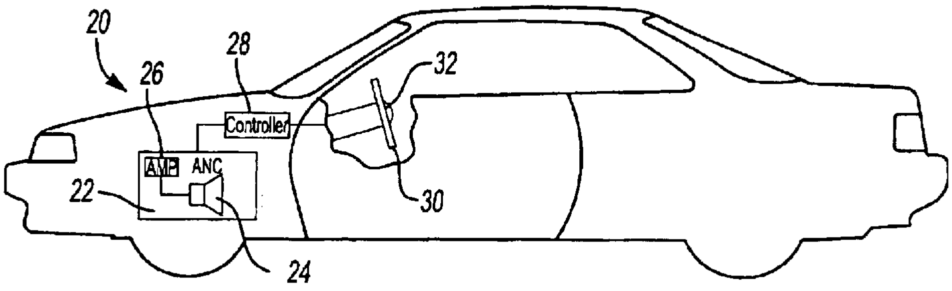
FIG. 1 schematically illustrates an active noise control system designed according to this invention supported on an example vehicle.

FIG. 1 schematically shows a vehicle 20 that includes an active noise control system 22. A speaker 24 and an amplifier 26 are driven by a controller 28. The speaker 24 is associated with, for example, the air intake manifold of the vehicle to cancel out noises associated with engine operation that would otherwise be noticeable within the vehicle passenger compartment. Known active noise cancellation techniques provide such results.

A steering wheel assembly 30 is supported within the vehicle passenger compartment. A horn switch 32, which operates in a conventional manner, is supported on the steering wheel assembly 30. In the example arrangement, the horn switch 32 does not activate a separate horn device supported within the engine compartment. Instead, the noise control system 22 provides the horn sound using the speaker 24. The controller 28 responds to activation of the horn switch 32 by driving the amplifier 26 and speaker 24 to emit a preselected horn sound.

The controller 28 operates in a normal operation mode while the vehicle is running. The controller 28 normally provides active noise control in a conventional manner. In the event that the horn switch 32 is activated, the controller 28 detects a horn switch activation and interrupts the active noise control temporarily so that the speaker 24 can be used to provide the desired horn sound.

It is desirable to provide an individual the ability to activate the horn even when the vehicle is not running. The controller 28 enters a power saving, standby mode when the ignition is turned off and the vehicle is not running. The controller 28 interprets a horn switch activation as a wake up signal when the controller is in the power saving mode. The controller 28 then responds to the horn switch activation by appropriately driving the speaker 24 to emit the horn sound.

Figure 2:
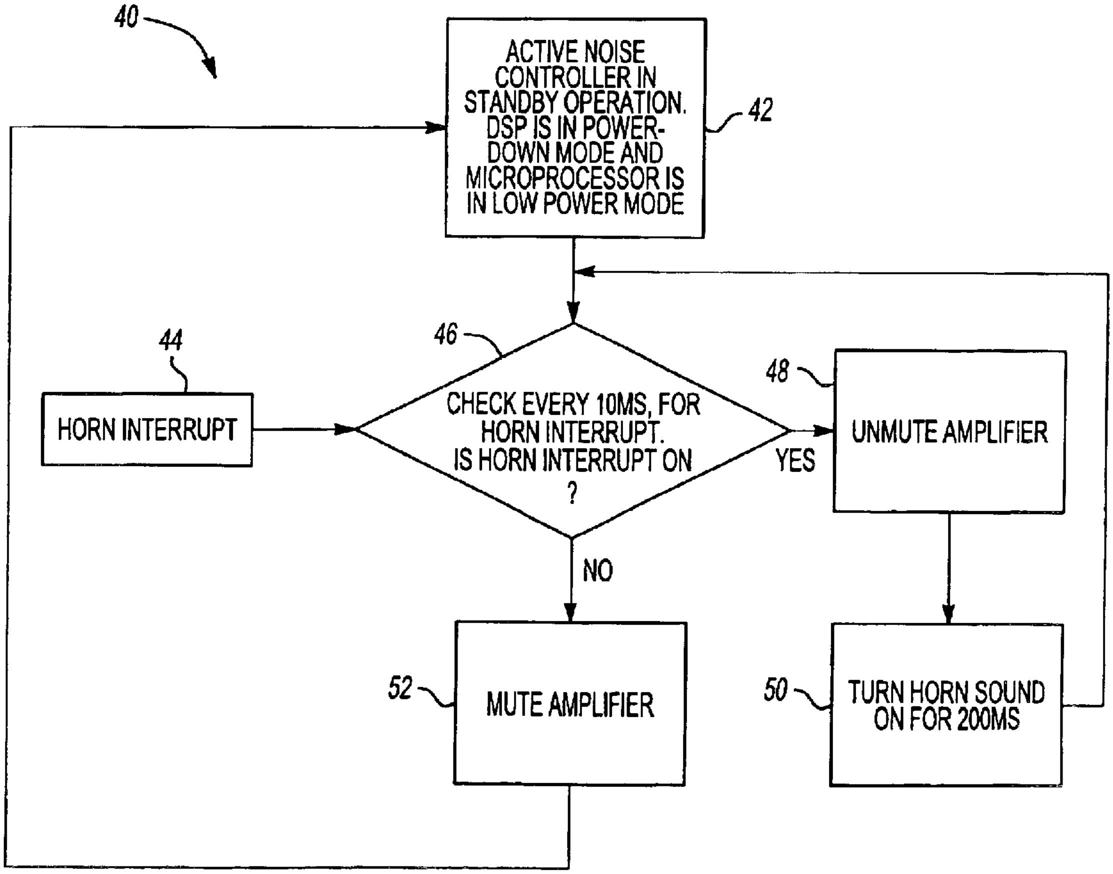
FIG. 2 is a flow chart diagram illustrating an example method of controller operation designed according to this invention.

FIG. 2 illustrates an example control strategy in flow chart form. At 42 the controller 28 is in the power saving mode. A horn switch activation at 44 provides a wake up signal to the controller 28. In one example, the horn switch activation produces a low digital signal (i.e., 0) that is interpreted by the controller 28 as a wake up signal. Once awakened, the controller 28 continues checking for a horn switch activation signal every ten milliseconds at 46. The controller 28 unmutes the amplifier 26 at 48 and drives the speaker 24 to emit the desired horn sound at 50. In the illustrated example, the horn sound is generated for 200 milliseconds. The controller 28 continues checking for horn switch activation and driving the speaker 24 to emit the horn sound as long as the signal is present.

Once the horn switch 32 is released, the determination at 46 is negative. The controller 28 then mutes the amplifier at 52 and returns to the power saving mode at 42.

In one example, the controller 28 comprises a digital signal processor (DSP). The DSP wakes up responsive to the horn switch activation signal and then controls the amplifier 26 and speaker 24 as necessary to achieve the desired horn sound. In another example, the controller 28 includes a microprocessor portion and a DSP portion. In this example, the microprocessor portion is responsible for handling the horn activation when the controller is in the power saving mode. In this latter example, the DSP remains in shutdown mode during horn activation when the vehicle is not running.

Those skilled in the art who have the benefit of this description will realize how best to select and arrange the electronics to achieve the horn activation strategy that best suits their particular needs.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. An active noise control system for use on a vehicle, comprising:

a speaker; and a controller that drives the speaker to emit a desired sound, the controller comprising a microprocessor portion and a digital signal processor portion, the controller operating in a normal mode that includes using the digital signal processor portion for active noise control when the vehicle is running, the controller operating in a power saving mode including placing the digital signal processor portion in a shutdown mode when the vehicle is not running, the controller wakes up responsive to a horn switch activation and the microprocessor portion drives the speaker to emit a horn sound while the digital signal processor portion remains in the shutdown mode.

2. The system of claim 1, including an amplifier and wherein the controller mutes the amplifier in the power saving mode and then unmutes the amplifier responsive to a horn switch activation.

3. The system of claim 1, wherein the controller monitors whether a horn switch activation occurs every ten milliseconds once the controller has woken up from the power saving mode responsive to a horn switch activation.

4. The system of claim 3, wherein the controller drives the speaker to emit the horn sound for 200 milliseconds.

5. The system of claim 1, wherein the controller responds to a horn switch activation in the normal mode and drives the speaker to emit the horn sound.

6. A method of producing a horn sound using a vehicle active noise control system having a controller, which includes a microprocessor portion and a digital signal processor portion, and a speaker, comprising the steps of:

operating the controller in a normal mode including using the digital signal processor portion for active noise control while the vehicle is running;

placing the controller in a power saving mode when the vehicle is not running including placing the microprocessor portion in a sleep mode and placing the digital signal processor portion in a shutdown mode;

responding to a horn switch activation by waking up the microprocessor portion from the sleep mode and driving the speaker using the microprocessor portion to emit a desired horn sound responsive to the horn switch activation while the digital signal processor portion remains in the shutdown mode.

7. The method of claim 6, wherein the active noise control system includes an amplifier associated with the speaker and including muting the amplifier when the controller is in the power saving mode and unmuting the amplifier responsive to the horn switch activation.

8. The method of claim 6, including determining whether a horn switch activation occurs every ten milliseconds after waking up the controller from the power saving mode.

9. The method of claim 8, including returning the controller to the power saving mode when no horn switch activation is present for two consecutive checks.

10. The method of claim 6, including responding to a horn switch activation when operating the controller in normal mode by driving the speaker to emit the desired horn sound.

11. The method of claim 10, including temporarily interrupting active noise cancellation responsive to the horn switch activation when operating the controller in normal mode.

* * * * *